Feb. 27, 1962  E. R. SCHMIDT  3,023,281
ELECTRONIC SWITCHING SYSTEM
Filed May 21, 1959  4 Sheets-Sheet 1

INVENTOR.
EDWARD R. SCHMIDT
BY
F. H. Henson
ATTORNEY

Feb. 27, 1962  E. R. SCHMIDT  3,023,281
ELECTRONIC SWITCHING SYSTEM
Filed May 21, 1959  4 Sheets-Sheet 3

Fig. 3A
AUDIO
AMPLIFIER-
AUA

Fig. 3B

Fig. 4A
CONVERTER-
CVB

Fig. 4B

Fig. 5A
CONVERTER
D.C. OUTPUT-
CVE

Fig. 5B

Fig. 6A
EMITTER
FOLLOWER-
EFD

Fig. 6B

Fig. 7A
FLIP-FLIP-
F1A

Fig. 7B

Feb. 27, 1962 — E. R. SCHMIDT — 3,023,281
ELECTRONIC SWITCHING SYSTEM
Filed May 21, 1959 — 4 Sheets-Sheet 4

Fig. 8A — GATE-GGA
AND / OR

Fig. 8B

Fig. 9A — AUDIO GATE-GVB
Fig. 9B

Fig. 10A — INVERTER-INA
Fig. 10B

Fig. 11A — INVERTER INX
Fig. 11B

Fig. 12A — DELAY INVERTER-INY
Fig. 12B

Fig. 13A — MONOSTABLE MULTIVIBRATOR MAA
Fig. 13B

Fig. 14A — INTEGRATOR TRIGGER-STA

Fig. 14B

United States Patent Office 3,023,281
Patented Feb. 27, 1962

3,023,281
ELECTRONIC SWITCHING SYSTEM
Edward R. Schmidt, Rochester, N.Y., assignor to General Dynamics Corporation, Rochester, N.Y., a corporation of Delaware
Filed May 21, 1959, Ser. No. 814,845
14 Claims. (Cl. 179—175.2)

This invention relates to an electronic switching system and, more particularly, to an electronic switching system controlled by plural frequency signals which includes means for checking the operability of various frequency responsive components therein.

In automatic electronic switching systems of the type described in detail in the copending application of J. G. Pearce et al., Serial No. 814,922, filed May 21, 1959, which copending application is assigned to the same assignee as the present application, signals of various different frequencies or combinations thereof are used for line extending and supervisory functions. Some of these plural frequency signals are detected to provide direct current marking or control voltages that control the performance of the different necessary functions of the system, such as establishing the identity of the called subscriber. Thus, the continuous operability of the frequency responsive devices is essential to the proper operation of the system.

Accordingly, one object of the present invention is to provide a new and improved electronic switching system using plural frequency signals.

Another object is to provide a system of this type including means for automatically checking the operability of frequency responsive components.

Another object is to provide an electronic switching system in which signals of one or more frequencies of a larger group of frequencies are applied to frequency responsive elements to control the operation of the system and in which signals including the entire group of frequencies are automatically applied to the frequency responsive elements to check the operability thereof.

A still further object is to provide a system for testing the operability of frequency responsive devices normally supplied with signals including different ones of a group of frequencies, which system includes means for supplying signals of all of the frequencies to the devices and means for checking the output of all of these devices.

Another object is to provide a plural frequency controlled switching system including both frequency responsive devices and means for checking the operability of the devices each time that they are used to set up a communication path.

A still further object is to provide an electronic switching system in which the availability of a plural frequency detecting means to be used in controlling the operation of the system is dependent on the satisfactory completion of a checking operation that is performed in conjunction with each operation of the detecting means.

In accordance with these and many other objects, an embodiment of the invention includes an electronic switching system that is adapted to provide communication paths between different pairs of subscriber lines. The electronic switching means is controlled at least in part by control voltages supplied thereto from a plurality of frequency responsive elements or detecting means which receive plural frequency signals from the calling lines. As an example, the digits of the designation of the called subscriber, which are represented by signals including different combinations of two frequencies, are applied to different pairs of detecting means to provide signals for controlling the switching system. In order to insure the continuous operability of the signal detecting or signal responsive components of the system, the system includes checking means which are placed in operation each time that the plural frequency detecting means is called into operation to supply signals to the electronic switching system.

This checking means includes a signal source including signal components of each of the various frequencies that normally can be applied to the detecting means. When a checking operation is to be initiated, the normal input to the detecting means is rendered ineffective and the test signal source is connected to the detecting means so that a voltage responsive network connected to the output of the detecting means is provided with control signals. If a control signal is received from each of the frequency responsive units or detecting channels, the checking circuit is actuated to disconnect the test signal source and to again render the detecting means responsive to signals from a calling line. Alternatively, if one or more of the signal detecting channels fails to provide a proper output, the checking circuit prevents further use of the detecting means.

Many other objects and advantages of the present invention will become apparent from the following description thereof when considered in conjunction with the drawings wherein.

Figure 15:
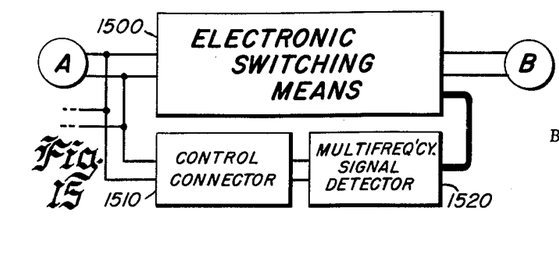
FIG. 15 is a block diagram illustrating an electronic switching system embodying the present invention.

Referring now specifically to FIG. 15 of the drawings, therein is shown an electronic switching system for automatically extending connections between a pair of substations A and B through an electronic switching means 1500. The electronic switching means 1500 can be of the type in which a communication path between the substations A and B is through one or more selectively controlled cross points or can be of the type disclosed in the above identified copending application in which the switching means 1500 establishes communication paths in at least partial dependence on differentially arranged time positions individually assigned to the various lines. In a system of this latter type, the initiation of a call from the substation A, for instance, places a control connector 1510 in operation so that a multifrequency detector 1520 is operatively associated with the calling line in the time position individually assigned thereto. This conditions the signal detector 1520 to receive plural frequency signals from the calling line representing such items of information as the designation of the called substation. The signal detector 1520 includes a plurality of separate signal detecting channels which provide one or more control voltages to the switching means 1500 in dependence upon the frequencies of the received signals for use in at least partially controlling the establishment of a communication path between the substations A and B. Following the transfer of the detected signals from the detector 1520 to the electronic switching means 1500, the control connector 1510 and the detector 1520 are dismissed.

Incident to this release, a checking circuit in the detector 1520 is placed in operation so that the normal input of the detector 1520 over which signals from the calling lines are received is rendered ineffective and a signal source is rendered effective to supply signals to the plurality of frequency responsive elements or detecting channels. The signal provided by this source includes a component corresponding to each of the frequencies that normally are received from the calling line. A voltage responsive network or gating means is connected to the outputs of the various detecting channels so that, if an output is received from each of the detecting channels signifying the operability thereof, the checking circuit is operated to disconnect the test signal source and to render the detecting channels effective to receive signals from the control connector 1510 when the next call is placed. Alternatively, in the event that one or more of the detecting channels fails to provide a suitable output signal, the voltage responsive network or gating means blocks the further reception of signals from calling lines and establishes an alarm condition to indicate the inoperability of the detector 1520.

Figure 1:
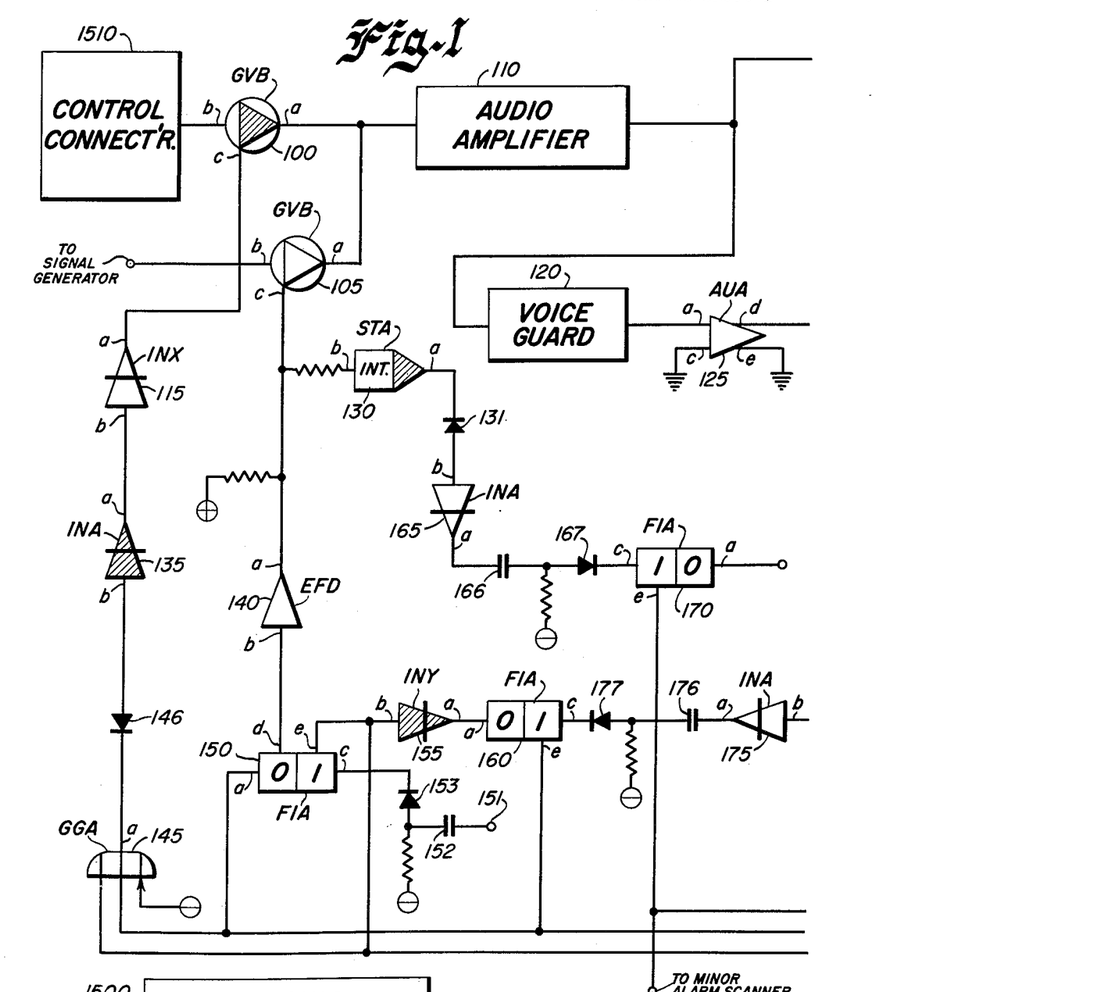
FIGS. 1 and 2, when placed adjacent each other, form a complete logic diagram illustrating the plural frequency detecting and checking means embodying the present invention.
Figure 2:
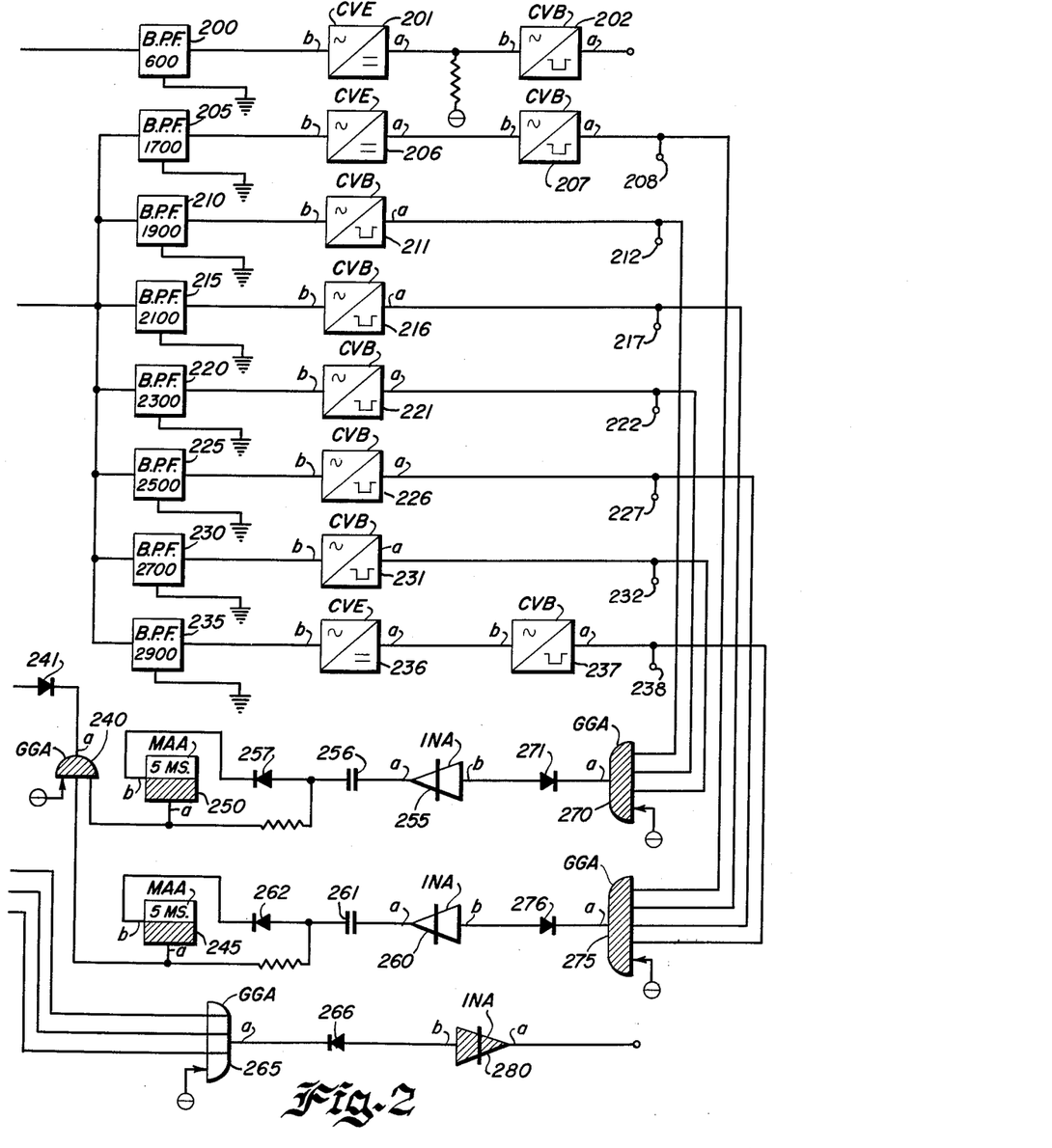

Since the multi-frequency signal detector 1520 is shown in FIGS. 1 and 2 of the drawings in the form of a logic diagram, FIGS. 3–14 of the drawings illustrate the various logic symbols used in the diagram in FIGS. 1 and 2. Each of these figures includes both an illustration of the logic symbol and a typical circuit represented by the symbol. Although the illustrated representative circuits are conventional in design and well known in the art, a brief description of each of these circuits is set forth below.

Figure 3A:
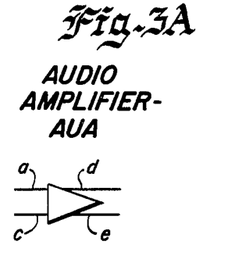
FIGS. 3–14 illustrate the logic symbols used in the diagram shown in FIGS. 1 and 2 together with a typical circuit represented by each of the logic symbols.
Figure 3B:
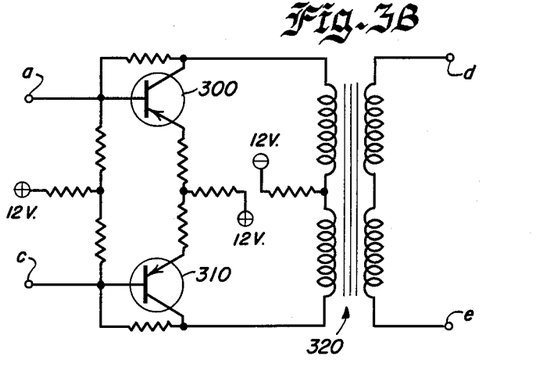

The logic symbol for an audio amplifier AUA is illustrated in FIG. 3A and a typical circuit represented by the symbol is shown in FIG. 3B. The circuit illustrated in FIG. 3B comprises a balanced amplifier including a pair of transistors 300 and 310 that are biased for class A operation. The signal to be amplified is applied across a pair of input terminals $a$ and $c$, and the amplified signals, which are derived from an output transformer 320, appear across a pair of output terminals $d$ and $e$. This amplifier can be used as a single-ended amplifier by grounding the input terminal $c$.

Figure 4A:
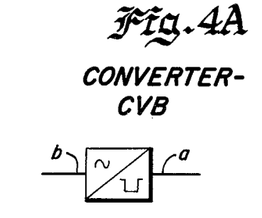
Figure 4B:
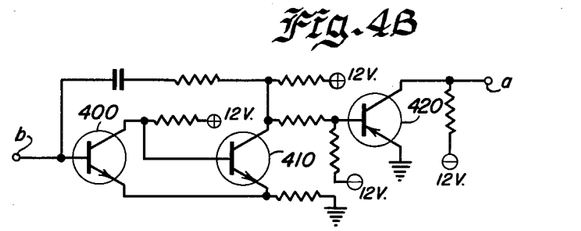

FIG. 4A of the drawings shows the logic symbol for a pulse output converter CVB, and a typical circuit represented by this symbol is shown in FIG. 4B. In general, the converter CVB comprises a trigger circuit including a pair of transistors 400 and 410 folowed by an inverter amplifier including a transistor 420. The transistors 400 and 410 form an emitter coupled trigger circuit in which the transistor 410 is normally conducting and the transistor 400 is normally non-conductive. When an alternating current signal is applied to an input terminal $b$, the positive half-cycles drive the base of the transistor 400 positive with respect to its emitter which is held at a positive potential by the conduction through the transistor 410. When the transistor 400 becomes conductive, the transistor 410 is rendered non-conductive and the emitter potentials of both of the transistors 400 and 410 drop toward ground to lock the circuit in its alternate or "on" condition. During each negative half-cycle of the signal applied to the input terminal $b$, the trigger circuit including the transistors 400 and 410 is returned to its normal or "off" condition. Thus, the alternating current signals applied to the input terminal $b$ appear as a series of positive-going pulses at the base electrode of the transistor 420. These positive-going pulses are inverted in the transistor 420 and appear as negative-going pulses at an output terminal $a$. Thus, the converter CVB converts applied alternating current signals into output pulses shifting between ground potential and a negative potential.

Figure 5A:
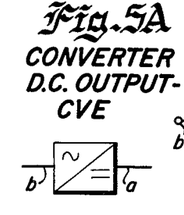
Figure 5B:
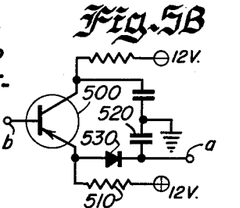

FIG. 5A discloses the logic symbol for a D.C. output converter CVE, and FIG. 5B discloses a typical circuit represented by the logic symbol shown in FIG. 5A. In the circuit shown in FIG. 5B, a transistor 500 is normally maintained in a conductive state so that the voltage drop across an emitter resistance element 510 normally provides an output of substantially ground potential at an output terminal $a$. When an alternating current signal is applied to an input terminal $b$, the positive half-cycles of this signal render the transistor 500 substantially non-conductive so that a condenser 520 is charged to a positive potential through a diode 530. During the negative half-cycles of the applied alternating current signal, the transistor 500 is rendered conductive, but the positive charge on the condenser 520 is not dissipated because of the reverse bias supplied to the diode 530. Accordingly, the application of an alternating current signal to the input terminal $b$ provides a relatively steady state positive potential at the output terminal $a$. Accordingly, the converter CVE, when energized with an alternating current or a pulsating direct current signal, provides a positive potential at the output terminal $a$.

Figure 6A:
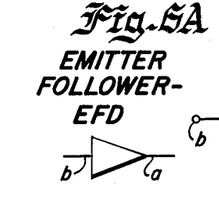
Figure 6B:
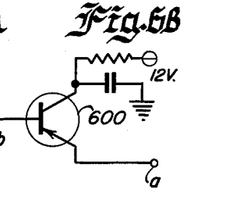

FIG. 6A illustrates the logic symbol for an emitter follower EFD, and FIG. 6B shows a typical circuit represented by this logic symbol. The emitter follower circuit includes a transistor 600 having an input terminal $b$ connected to the base electrode and an output terminal $a$ connected to the emitter electrode.

Figure 7A:
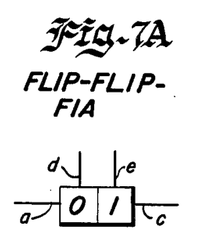
Figure 7B:
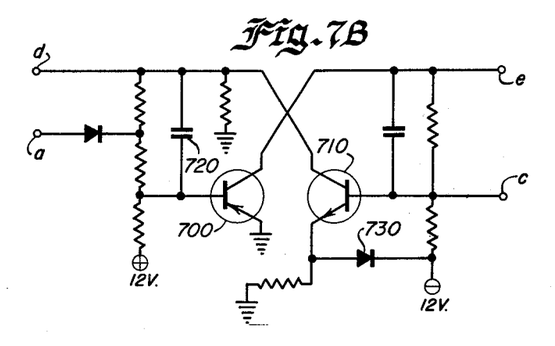

The logic symbol for a flip-flip circuit FIA is illustrated in FIG. 7A of the drawings, and FIG. 7B discloses a typical circuit represented by this symbol. In the normal or reset condition of the flip-flip circuit FIA, a pair of transistors 700 and 710 are non-conductive so that a slightly positive potential appears at a terminal $d$ and negative potential appears at a terminal $e$. The potentials applied to the terminals $d$ and $e$ in the normal condition of the flip-flip circuit FIA are illustrated in the logic symbol by the connection of the terminal $d$ to the half of the flip-flip circuit marked "0" and by the connection of the terminal $e$ to the half of the flip-flip circuit marked "1." The circuit FIA is triggered to a condition in which both of the transistors 700 and 710 are conductive by the application of a positive pulse to an input terminal $c$. This positive-going pulse drives the base of the transistor 710 positive with respect to its emitter electrode and thus places the transistor 710 in conduction. When the transistor 710 begins to conduct, a negative-going pulse is coupled through a capacitor 720 to the base elecrtode of the transistor 700. This places the base electrode of this transistor negative wth respect to its emitter electrode so that the transistor 700 is placed in a conductive condition. In this operated or "on" condition, the terminal $e$ is connected to ground through the conductive transistor 700, and the terminal $d$ is connected to a negative potential through the conductive transistor 710 and a diode 730. The flip-flip circuit FIA is returned to a normal or reset condition in which the transistors 700 and 710 are in a non-conductive state by the application of a positive pulse to a terminal $a$.

The diode 730, which is of the silicon type, is connected between the emitter electrode of the transistor 710 and a source of negative potential in order to insure the reverse biasing of the base-emitter junction of the transistor 710 when the flip-flip circuit FIA is in its reset or normal condition. The voltage drop across a silicon diode is approximately .6 volt for all of the values of forward current exceeding a certain minimum value. Thus, the emitter of the transistor 710 is biased .6 volt positive with respect to its base whenever the transistor 700 is in a non-conductive condition.

Figure 8A:
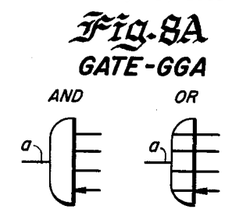
Figure 8B:
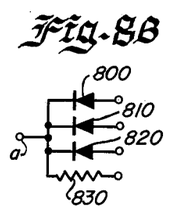

The two logic symbols for a gate GGA are illustrated in FIG. 8A, and a typical circuit represented by these symbols is shown in FIG. 8B. As illustrated, the gate GGA includes a plurality of diodes 800, 810 and 820, the cathodes of which are connected together and to a common output terminal $a$. The anodes of the diodes 800, 810 and 820 provide individual inputs to the gate circuit. A resistor 830 connected to the output terminal $a$ provides a resistance input for the gate circuit. The gate GGA may be used as either an "AND" gate for negative signals or an "OR" gate for positive signals. That is, with the resistor 830 connected to a negative potential, the output terminal $a$ will drop to the negative potential only when all of the input terminals are returned to a negative potential. The output terminal $a$ will rise to ground potential when any one or more of the input terminals is returned to ground potential. In the circuit shown in FIGS. 1 and 2, the logic symbol for the gate GGA is shaded when the output terminal $a$ is at ground in the normal condition of the circuit and is not shaded when the output terminal $a$ is normally at a negative potential. In the logic symbol shown in FIG. 8A, the "AND" gate is indicated by lines from the input terminals which do not extend through the rounded rectangular block. Conversely, in the logic symbol for the "OR" gate, the lines from the input terminals extend through the rounded rectangular block. The resistance input for both the "OR" gate and the "AND" gate is indicated by the application of a closed arrowhead to the input lead.

Figure 9A:
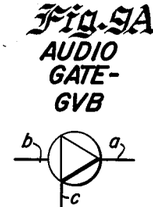
Figure 9B:
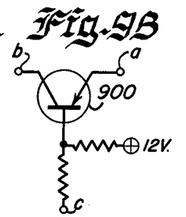

The logic symbol for an audio gate GVB is illustrated in FIG. 9A, and a typical circuit represented by this symbol is illustrated in FIG. 9B. The gate circuit GVB is normally used for gating the output of an alternating current signal generator to a load circuit. In the circuit shown in FIGS. 1 and 2, an input terminal is returned to ground potential through a signal source, and an output terminal $a$ is returned to ground potential thorugh a load circuit, such as an amplifier. Thus, when ground potential is applied to a control terminal $c$, the base electrode of a bilateral switching transistor 900 is maintained positive with respect to both of the electrodes illustrated as an emitter and a collector, and the transistor 900 remains non-conductive. However, when a negative potential is applied to the control terminal $c$, both of the junctions of the transistor 900 are biased in the forward direction in the absence of input signals and the transistor 900 is rendered fully conductive to effectively interconnect the terminals $b$ and $a$.

Figures 10A, 10B:
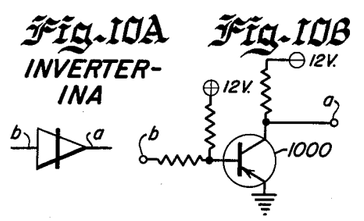

The logic symbol for an inverter INA is shown in FIG. 10A of the drawings, and a typical circuit represented by this logic symbol is shown in FIG. 10B. The inverter circuit includes a transistor 1000 that is normally biased to a non-conductive state by the application of a positive potential to the base electrode thereof. Thus, the normal output of the inverter INA at an output terminal $a$ is a negative potential. However, when a sufficiently large negative potential is applied to an input terminal $b$, the base electrode is driven negative with respect to the grounded emitter electrode and the transistor 1000 is placed in conduction to return the ouput terminal $a$ to ground potential. In the circuit shown in FIGS. 1 and 2, the logic symbol for the inverter INA is shown in the form illustrated in FIG. 10A when the output terminal $a$ is at a negative potential in its normal condition in the circuit. However, if a negative potential is normally supplied by the circuit to the input terminal $b$ so that the transistor 1000 is normally in a conductive state, the logic symbol for the inverter INA is shaded to indicate that the output terminal $a$ is at ground potential.

Figures 11A, 11B:
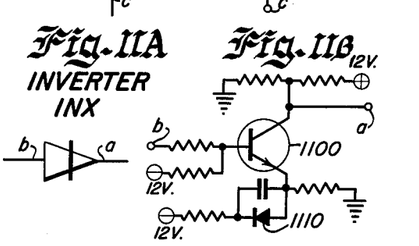

FIG. 11A illustrates the logic symbol for a low speed inverter INX, and FIG. 11B illustrates a typical circuit represented by the logic symbol shown in FIG. 11A. The inverter INX includes a transistor 1100 having an emitter electrode that is normally maintained as a somewhat negative potential through a forward biased diode 1110. If a negative input is applied to an input terminal $b$, the base electrode of the transistor 1100 is maintained negative with respect to its emitter electrode, and the transistor 1100 is maintained in a non-conductive condition so that a positive potential is supplied to an output terminal $a$. When the potential applied to the input terminal $b$ is shifted in a positive direction, the base electrode is driven positive relative to the emitter electrode and the transistor 1100 conducts to place the output terminal $a$ at a more negative potential.

Figures 12A, 12B:
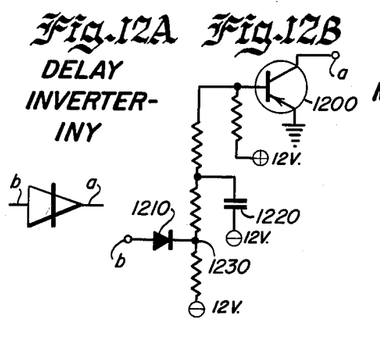

FIG. 12A of the drawings illustrates the logic symbol for a delay inverter INY, and FIG. 12B illustrates a typical circuit represented by this logic symbol. In the normal condition of the circuit shown in FIG. 12B, a transistor 1200 is normally held in a conductive condition so that an output terminal $a$ is held substantially at ground potential. In this condition, which is assumed to be the normal condition, a diode 1210 connected to an input terminal $b$ is assumed to be connected to a negative potential so that the diode 1210 is biased in its reverse direction. The transistor 1200 is maintained conductive in this normal condition by the voltage dividing network connected between the positive and negative potential sources. This voltage dividing network also normally maintains a capacitor 1220 charged to a relatively negative potential.

When the terminal $b$ is connected to ground potential, the diode 1210 is biased in a forward direction and connects ground to an intermediate point 1230 in the voltage dividing network. This causes the condenser 1220 to charge rapidly in a positive direction so that, after a time delay of approximately 5 milliseconds, the base electrode of the transistor 1200 goes to a potential that is positive with respect to the grounded emitter to interrupt conduction through the transistor 1200. When the input terminal $b$ is returned to a negative potential, thus biasing the diode 1210 in a reverse direction, the condenser 1220 begins to charge in a negative direction so that, after a time delay of approximately 30 milliseconds, the base electrode of the transistor 1200 is returned to a potential that is negative with respect to its grounded emitter. This places the transistor 1200 in conduction so that the output terminal $a$ is again effectively connected to ground. Accordingly, the delay inverter INY, in response to a transition from a negative potential to a ground potential at the input terminal $b$, shifts the output terminal $a$ from ground potential to an open circuit after a short time delay of approximately 5 milliseconds. Alternatively, when the input terminal $b$ is provided with a transition from ground potential to a negative potential, the output terminal $a$ shifts from an open circuit to substantially ground potential after a relatively long time delay of 30 milliseconds. When the logic symbol shown in FIG. 12A is illustrated in the circuit shown in FIGS. 1 and 2 of the drawings, the triangular figure is shaded when the circuit arrangement is such that the transistor 1200 is normally maintained conductive to connect the output terminal $a$ to ground potential.

Figures 13A, 13B:
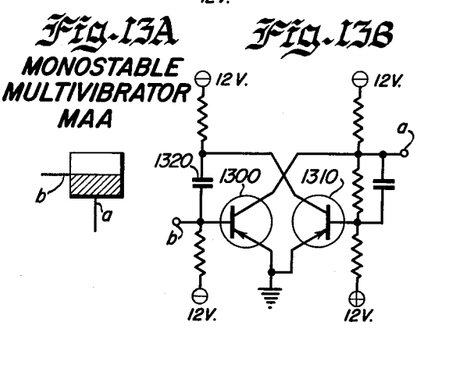

FIG. 13A of the drawings illustrates the logic symbol for a monostable multivibrator MAA, and FIG. 13B of the drawings illustrates a typical circuit represented by this logic symbol. In a normal condition, a transistor 1310 is in a non-conductive condition and a transistor 1300 is in a conductive condition so that an output terminal $a$ is connected to ground. When a positive pulse is applied to an input terminal $b$, the transistor 1300 is rendered non-conductive and the transistor 1310 is rendered conductive to couple a positive-going pulse through a capacitor 1320 to the base electrode of the transistor 1300. The monostable multivibrator MAA remains in this condition and until the positive potential across the condenser 1320 dissipates to a point at which the base electrode of the transistor 1300 again becomes negative with respect to its grounded emitter. Thus, the output terminal $a$ is provided with a negative-going pulse of a variable duration dependent upon the time constants of the components used in the circuit MAA. In the logic symbol, the output terminal $a$ is connected to the shaded portion of the block to indicate that this terminal normally stands at ground potential. Further, when the logic symbol shown in FIG. 13A is illustrated in FIGS. 1 and 2 of the drawings, the upper portion of the block is marked with a legend indicating the duration of the negative-going pulse provided at the output terminal $a$.

Figure 14A:
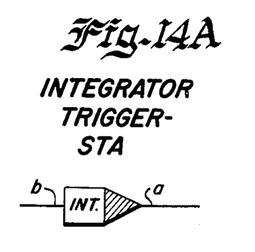
Figure 14B:
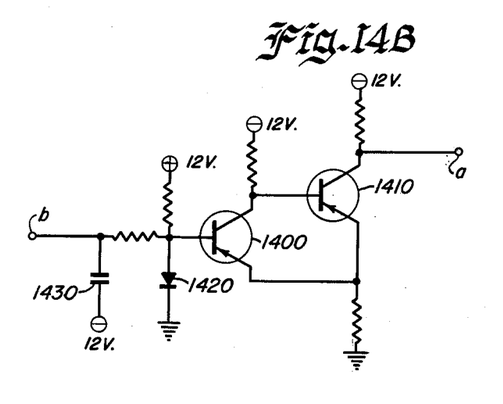

FIG. 14A of the drawings illustrates the logic symbol for an integrator trigger STA, and FIG. 14B shows a circuit represented by this symbol. In the normal condition of the circuit, a transistor 1410 is in a conductive condition so that an output terminal $a$ is connected to ground. The negative biasing potential developed across the common emitter resistor for the transistor 1410 and a transistor 1400 biases the emitter electrode of the transistor 1400 negative with respect to its base electrode which is held at ground potential by a forward biased diode 1420. When a negative signal is applied to an input terminal b, an integrating capacitor 1430 begins to charge in a negative direction. After a suitable time delay, such as 100 milliseconds, the integrating condenser 1430 has been charged in a negative direction to a value sufficient to bias the diode 1420 in a reverse direction and to decrease the potential applied to the base electrode of the transistor 1400 below the potential of its emitter electrode. Thus, the transistor 1400 is placed in conduction to terminate conduction through the transistor 1410. At this time, the potential at the output terminal a drops to a negative value and remains at this level until such time as the negative input signal is removed from the input terminal b and the integrating condenser 1430 charges in a positive direction to a potential at which the diode 1420 is again forward biased to hold the base electrode of the transistor 1400 at ground. At this time, the conduction through the transistor 1400 is terminated and the transistor 1410 is again placed in a conductive condition to return the output terminal a to ground. In view of the fact that the output terminal a is normally at ground potential, the triangular portion of the logic symbol illustrated in FIG. 14A is shaded.

Referring now more specifically to FIGS. 1 and 2 of the drawings, a circuit diagram of the multifrequency signal detector 1520 is shown there in logic schematic form. As indicated above, during the establishment of a connection from a calling substation A to a called substation B, for instance, the control connector 1510 operates to connect the multifrequency signal detector 1520 to the calling line so that various single or plural frequency signals received from the calling line are effective to at least partially control the operation of the electronic switching means 1500 to establish a connection. The output of the control connector 1510 is connected to an input terminal b of an audio gate 100, the output terminal a of which is connected to an audio amplifier 110. The terminal c of the audio gate 100 is connected to the output terminal a of an inverter 115 which is normally held in a conductive state so that a negative potential is applied to the terminal c of the gate 100. Thus, this gate is normally biased to an open condition so that the signals received from the control connector 1510 are applied to the input of the audio amplifier 110.

As an example, one of the single frequency control signals applied to the input of the audio amplifier 110 is a 600 cycle tone. This signal is amplified and applied through a band-pass filter 200 to the b input terminal of a direct current output converter 201, the output of which is connected to the b input terminal of a pulse output converter 202. Thus, whenever a 600 cycle tone is supplied through the control connector 1510 to the audio gate 100, the converter 202 provides a relatively steady negative potential at its output terminal a which is forwarded to the electronic switching means 1500.

Another group of different frequency signals are supplied from the output of the audio amplifier 110 through a voice guard circuit 120 and an audio amplifier 125 to the input of a plurality of band-pass filters 205, 210, 215, 220, 225, 230 and 235. The voice guard circuit 120 is provided to prevent improper operation of the signal detector 1520 in response to voice signal components having the same frequencies as the components used to control the operation of the system. A suitable voice guard circuit is disclosed in the copending application of D. M. Rager, Jr., et al., Serial No. 760,940, filed September 15, 1958, which application is assigned to the same assignee as the present application. The plurality of filters 205, 210, 215, 220, 225, 230 and 235 are tuned to pass signals of 1700, 1900, 2100, 2300, 2500, 2700 and 2900 cycles per second, respectively. The 1700 and 2900 c.p.s. signals are used for control purposes, and the 1900, 2100, 2300, 2500 and 2700 c.p.s signals are received from the calling lines in different combinations to represent digital information.

Whenever control tones of 1700 c.p.s. or 2900 c.p.s. frequencies are supplied to the filters 205 or 235, these signals are converted to relatively steady state positive potentials by a pair of converters 206 and 236 and are applied to a pair of converters 207 and 237. These latter two converters forward negative marking potentials to the electronic switching means 1500 which is connected to a pair of output terminals 208 and 238. Similarly, when input signals including various pairs of the 1900, 2100, 2300, 2500 and 2700 c.p.s frequencies are applied to the filters 210, 215, 220, 230, these signals are applied to the b input terminals of a plurality of pulse output converters 211, 216, 221, 226 and 231 to provide different pairs of negative-going pulses. These pulses are supplied to the electronic switching means 1500 which is connected to a plurality of output terminals 212, 217, 222, 227 and 232. Thus, during the establishment of a communication path through the electronic switching means 1500, different ones or pairs of the frequency responsive channels including the band-pass filters and converters illustrated in FIG. 2 of the drawings are energized to provide control potentials for use by the electronic switching means 1500. At the point in the selective establishment of the communication path at which the multifrequency signal detector 1520 is no longer needed, the control connector 1510 is released so that the detector 1520 is no longer responsive to signals supplied by the calling line.

The release of the multifrequency detector 1520 causes this circuit to perform a self-checking operation to insure that all of the frequency responsive or detecting channels including the band-pass filters 205, 210, 215, 220, 225, 230 and 235 and the converters 206, 207, 211, 216, 221, 226, 231, 236 and 237 are in a proper operating condition. It is desirable to check the operability at each of these detecting channels following each operation of the multifrequency signal detector 1520 inasmuch as the proper operation of these channels is necessary to insure the provision of accurate digital and control or supervisory information to the electronic switching means 1500.

This checking operation is initiated by the application of the positive-going pulse to an input terminal 151 which is coupled to the c terminal of a flip-flip circuit 150 through a capacitor 152 and a diode 153. In response to the receipt of this positive-going signal on its c terminal, the conductive state of the input flip-flip circuit 150 is reversed so that the potential applied to the e terminal thereof switches from a negative potential to ground potential. The application of ground potential to this terminal opens an "OR" gate 145 so that a diode 146 provides a more positive potential to the input terminal b of an inverter 135. The inverter 135 is normally in a conductive condition so that the more positive potential applied to the b terminal renders the inverter 135 non-conductive to cause the potential at its output terminal a to drop to a negative value. This negative voltage is applied to the b input terminal of the inverter 115 to render this inverter non-conductive so that the potential applied to its output terminal a rises to a more positive potential. This positive potential closes the audio gate 100 so that signals received from a calling line through the control connector 1510 can no longer be supplied to the input of the audio amplifier 110.

The transition of the potential applied to the e terminal of the flip-flip 150 from a negative potential to a ground potential also opens a second "OR" gate 265 so that a more positive potential is applied through a diode 266 to the b input terminal of an inverter 280. The inverter 280 is normally in a conductive condition, and the application of the more positive potential to the b terminal thereof renders this inverter non-conductive so that its output terminal *a* drops to a more negative potential. The output terminal *a* of the inverer 280 is connected to the electronic switching means 1500 and is used to provide a reset signal at the completion of the checking operation in the form of a transition from a negative potential to ground potential. However, the output of the inverter 280 is maintained at a negative potential by the "OR" gate 265 until such time as the flip-flip 150 is restored to its normal or reset condition.

Referring back to the above described operation of the flip-flop circuit 150, the operation of this circuit to its alternate conductive state changes the potential at its *d* terminal from ground to a negative value. When this potential is applied to the input terminal *b* of an emitter follower 140, its output terminal *a* becomes more negative. This output terminal is connected to the input terminal *c* of another audio gate circuit 105, the *a* terminal of which is connected to the input of the audio amplifier 110 and the *b* terminal of which is connected to a signal generator. This signal generator provides a signal including a component of each of the frequencies to which the filters 205, 210, 215, 220, 225, 230 and 235 are tuned. Thus, the opening of the audio gate 105 causes the concurrent energization of all of the detecting channels in the multifrequency signal detector 1520 that are to be checked.

The concurrent energization of all of the detecting channels causes the converters 207, 211, 216, 221, 226, 231, and 237 to provide a negative-going potential at the output terminals *a* thereof only when all of the detecting channels are in a proper operating condition. These output terminals, in addition to being connected to the electronic switching means 1500, are also connected to a pair of "AND" gates 270 and 275. If the channels for detecting the 1900, 2300 and 2700 c.p.s. signals are all in a proper operating condition so that the negative potentials appear at the outputs thereof, the output of the "AND" gate 270 drops from ground potential to a negative potential. This potential is effective through a diode 271 to place an inverter 255 in conduction so that the output terminal *a* thereof rises from a negative potential toward ground. This provides a positive-going pulse that is coupled through a capacitor 256 and a diode 257 to the *b* input terminal of a monostable multivibrator 250. The application of the positive pulse to the *b* terminal triggers the multivibrator 250 to its unstable state so that the *a* terminal thereof drops from ground potential to a more negative potential and thus conditions one of the inputs to an "AND" gate 240.

Similarly, if the detecting channels for the 1700, 2100, 2500 and 2900 c.p.s. signals are in a proper operating condition, the negative signals derived from the outputs thereof are applied to the inputs of the "AND" gate 275 so that the output potential thereof falls in a negative direction. This is effective through a diode 276 to render an inverter 260 conductive. This provides a positive-going pulse which is coupled through a capacitor 261 and a diode 262 to the *b* input terminal of a monostable multivibrator 245. This positive pulse switches the multivibrator 245 to its unstable state and changes the potential applied to its *a* terminal from ground to a negative value. The multivibrator 245 provides a second enabling input to the "AND" gate 240.

When both of the inputs to the "AND" gate 240 drop to a negative potential, the output terminal *a* thereof also drops to a negative potential and is effective through a diode 241 to place an inverter 175 in conduction. When inverter 175 is placed in conduction, a positive-going pulse is coupled through a capacitor 176 and a diode 177 to the *c* terminal of an output flip-flip 160. The application of a positive pulse to this terminal shifts the flip-flip 160 to its second stable state and signifies the satisfactory completion of the checking operation.

More specifically, when the flip-flip circuit 160 is shifted to its operated condition, the *e* terminal thereof rises to ground potential which is forwarded to the two "OR" gates 145 and 265. The ground potential applied to the "OR" gate 145 maintains the audio gate 100 in a closed condition. The ground potential applied to the "OR" gate 265 maintains the inverter 280 in a non-conductive state to hold the potential applied to the electronic switching means 1500 at a negative value. In addition, when the terminal *e* of the flip-flip 160 rises to ground potential, the *a* terminal of the input flip-flip 150 is elevated to ground potential so that the flip-flip 150 is reset to its normal condition in which the terminal *d* is connected to ground and the terminal *e* is connected to a negative potential. The transition to a negative potential at the *e* terminal does not affect the "OR" gates 145 and 265 inasmuch as a negative potential is maintained on one of the inputs thereof from the flip-flip 160. However, when the *d* terminal rises to ground potential, the emitter follower 140 is cut-off and the potential applied to the *c* terminal of the audio gate 105 rises to a positive value. Thus, the gate 105 is closed and the composite multifrequency signal from the signal generator is no longer applied to the input of the audio amplifier 110.

When the gate 105 is closed to disconnect the signal generator, the energizing signals are concurrently removed from all of the band-pass filters 205, 210, 215, 220, 225, 230 and 235 so that the outputs of the converters 207, 211, 216, 221, 226, 231 and 237 return to ground potential. This closes the "AND" gates 270 and 275 so that the inverters 255 and 260 restore to a non-conductive condition. The monostable multivibrators 250 and 245 are restored to normal independently of the resetting of the inverters 255 and 260 since the circuits 245 and 250 are monostable circuits. When the multivibrators 245 and 250 are both restored to normal, the output terminals *a* thereof return to ground potential and the "AND" gate 240 is blocked. This is effective to restore the inverter 175 to its normal condition in which the output terminal *a* is held at a negative potential. The negative-going pulse coupled through the capacitor 176 when the inverter 175 is restored to normal is blocked by the diode 177.

To provide a means for resetting the output flip-flip 160 at the conclusion of a satisfactory checking operation, an inverter 155 is connected between the *e* terminal of the input flip-flip 150 and the *a* terminal of the output flip-flip 160. The inverter 155 is of the INY type which, as described above, provides a short time delay of approximately 5 milliseconds following the receipt of a ground signal at its input terminal *b* before its output terminal *a* goes from ground to an open circuit. This time delay is considerably less than the time required for the resonant circuits in the input filters 205, 210, 215, 220, 225, 230 and 235 to develop an output voltage of a useful level following the application of energizing signals to the inputs thereof. Accordingly, when the input flip-flip 150 is triggered to open the audio gate 105, the terminal *a* of the delay 155 goes to an open circuit condition before the output flip-flip 160 can be switched to its operated condition by the satisfactory completion of a checking operation. Thus, when the output flip-flip 160 is switched to its alternate condition in which the *e* terminal is connected to ground, the open circuit provided at the terminal *a* of the delay inverter 155 has no effect. However, when the input flip-flip circuit 150 is reset to its normal condition under the control of the output flip-flip 160, the application of the negative potential to the *b* terminal of the delay inverter 155 begins the timing of a second delay interval of approximately 30 milliseconds. During this 30 millisecond delay, the voltages in the resonant circuits in the filters 205, 210, 215, 220, 225, 230 and 235 decay to insure that the flip-flip 160 is not inadvertently reoperated after it has been reset by the input flip-flip 150. Thus, at the end of the 30 millisecond delay period, the *a* terminal of the delay inverter 155 goes to ground, and this ground elevates the *a* terminal of the output flip-flip 160 to ground so as to reset the flip-flip 160 to its reset or normal condition in which the terminal e is at a negative potential.

The transition of the e terminal of the output flip-flip 160 to a negative potential opens the audio gate 100 and forwards a rest signal from the multifrequency detector 1520 to the electronic switching means 1500 to indicate the satisfactory completion of the checking operation. More specifically, when the terminal e in the output flip-flip 160 drops to a negative potential, all of the inputs to the "OR" gate 145 are at a negative potential so that a more negative potential is supplied through the diode 146 to the input terminal b of the inverter 135. This places the inverter 135 in conduction so that the inverter 115 is also placed in conduction to return the c terminal of the audio gate 100 to a negative potential. This effectively connects the control connector 1510 to the input of the audio amplifier 110. Since the audio gate 105 is now closed, the audio amplifier 110 is only responsive to signals derived from a calling line under the control of the connector 1510.

In order to indicate the satisfactory completion of the check operation in the multifrequency detector 1520, the drop in potential at the output terminal e of the flip-flip 160 also places all of the inputs to the "OR" gate 265 at a negative potential so that the b terminal of the inverter 280 is returned to a more negative potential through the diode 266. This places the inverter 280 in conduction so that the potential at its output terminal a again rises to ground. This positive-going signal advises the electronic switching means 1500 that the checking operation has been satisfactorily completed.

The multifrequency signal detector circuit 1520 also includes means for detecting and providing an indication of the inoperability of one or more of the frequency detecting channels. Assuming that one of the detecting channels, such as the one including the band-pass filter 215 and the converter 216, is inoperative, the operation of the input flip-flip circuit 150 to open the audio gate 105 and to close the audio gate 100 does not result in the application of a negative potential to one of the inputs of the "AND" gate 275. Thus, the inverter 260 is not rendered conductive to trigger the monostable multivibrator 245. Accordingly, the "AND" gate 240 remains closed, and the inverter 175 is not operative to provide an operating pulse for the output flip-flip 160. Accordingly, the checking circuit can not be restored in the manner set forth above. To provide an indication of this inoperability and to maintain the multifrequency signal detector 1520 in an inoperative state where one of the detecting channels fails to operate properly, the circuit 1520 includes an alarm flip-flip circuit 170 which is operated a predetermined time interval following the initiation of the checking operation if the checking operation has not reached a proper conclusion.

More specifically, when the input flip-flip circuit 150 is operated to lower the terminal d to a negative potential, the emitter follower 140 is rendered conductive to apply a negative potential to the c terminal of the audio gate 105, thereby opening this gate to connect the multifrequency generator to the input of the audio amplifier 110. Concurrently, therewith, the negative signal developed at the a terminal of the emitter follower 140 is applied to the input terminal b of an integrator trigger 130. As described in detail above, the application of a negative signal to the input of the circuit 130 causes the a terminal thereof to shift from ground potential to a negative potential after a predetermined elapsed time such as 100 milliseconds. If the checking operation is satisfactorily completed, the negative potential is removed from the terminal b of the integrator trigger 130 before the expiration of this period, and this circuit remains in its normal condition in which the a terminal is connected to ground. However, if the checking operation is not satisfactorily completed within the 100 milliseconds delay period, the a terminal of the circuit 130 drops to a negative potential and biases a diode 131 so that the b terminal of an inverter 165 drops to a more negative potential.

This places the inverter 165 in conduction so that a positive-going pulse is coupled from the a terminal thereof to the c terminal of the alarm flip-flip 170 through a capacitor 166 and a diode 167. This operates the alarm flip-flip 170 to its alternate stable state in which the ground potential on the e terminal is extended to a minor alarm scanner to provide an indication of the improper operating condition in the multifrequency signal detector 1520. This ground potential is also forwarded to one of the inputs of the "OR" circuit 265 and serves to hold the inverter 280 in a non-conductive condition. This prevents the multifrequency signal detector 1520 from transmitting a positive-going pulse to the electronic switching means 1500 to indicate a satisfactory completion of the checking operation. Further, since the output flip-flip 160 is not operated, the input flip-flip 150 remains in an operated condition in which the "OR" gate 145 is opened. This holds the audio gate 100 in a closed condition so that signals can not be received from the control connector 1510. The circuit can be restored to a normal condition by applying a positive-going pulse to or by connecting ground potential to the a terminal of the flip-flip 170 from a suitable external source.

Although the present invention has been described in conjunction with a particular type of electronic switching system, it should be understood that this invention is useful in many different environments and applications which can be devised by those skilled in the art and which will fall within the spirit and scope of the principles of this invention.

What is claimed and desired to be secured by Letters Patent of the United States is:

1. In an electronic switching system, a pair of subscriber lines, switching means for establishing a communication path between said lines in at least partial dependence on control voltages applied to said switching means, detecting means responsive to plural frequency signals derived from at least one of said lines for supplying said control voltages to said switching means in accordance with the plural frequency signals, a source of plural frequency signals, input means for alternately rendering said detecting means responsive to plural frequency signals from said source or from said lines, a voltage responsive network supplied with said control voltages from said detecting means, and means controlled at least in part by said voltage responsive network for operating said input means.

2. In an electronic switching system, a pair of subscriber lines, electronic switching means for establishing a communication path between said pair of lines, control means including plural frequency detecting means for supplying control signals to said electronic switching means to control the operation thereof, connecting means for rendering said control means responsive to plural frequency signals applied to one of said lines so as to provide said control signals to said electronic switching means and for then rendering said control means nonresponsive to signals from said lines, test means including means for applying plural frequency signals to said detecting means to check the operation thereof, and means operated incident to each operation of said connecting means for rendering said test means effective to test said control means.

3. In an electronic switching system, a plurality of lines, electronic switching means common to said lines for extending a communication path from a calling one of said lines in accordance with plural frequency signals applied to the calling line, frequency responsive detecting means common to said lines and responsive to plural frequency signals derived from the calling line for controlling said electronic switching means, means for rendering said detecting means responsive to plural frequency signals from a calling line, check means for determining the operability of said detecting means, and means for rendering said check means effective to determine the operability of said detecting means each time that said detecting means is rendered responsive to plural frequency signals from a calling line.

4. In an electronic switching system, a pair of lines, switching means for establishing a communication path between said lines in at least partial dependence on control voltages applied to said switching means, a plurality of detecting means each responsive to an applied signal of a different frequency to provide an output signal to said switching means, first input means for supplying different frequency signals derived from said least one of said lines to said plurality of detecting means, second input means for applying signals of all of said different frequencies to said plurality of detecting means, a bistable switching device for controlling said first and second input means, said bistable switching device being operable to a first condition in which the first input means is effective and the second input means is ineffective and to a second condition in which the first input means is ineffective and the second input means is effective, and means for operating said bistable switching device between said first and second conditions.

5. In an electronic switching system, a pair of lines, switching means for establishing a communication path between said lines in at least partial dependence on control voltages applied to said switching means, a plurality of detecting means each responsive to an applied signal of a different frequency to provide an output signal to said switching means, first input means for supplying different frequency signals derived from said least one of said lines to said plurality of detecting means, second input means for applying signals of all of said different frequencies to said plurality of detecting means, a bistable switching device for controlling said first and second input means, said bistable switching device being operable to a first condition in which the first input means is effective and the second input means is ineffective and to a second condition in which the first input means is ineffective and the second input means is effective, control means for operating said bistable switching device between said first and second conditions, voltage responsive means controlled by said output signals, and means controlled by said voltage responsive means for operating said control means.

6. In an electronic switching system, a pair of lines, switching means for establishing a communication path between said lines in at least partial dependence on control voltages applied to said switching means, a plurality of detecting means each responsive to an applied signal of a different frequency to provide an output signal to said switching means, first input means for supplying different frequency signals derived from said least one of said lines to said plurality of detecting means, second input means for applying signals of all of said different frequencies to said plurality of detecting means, a bistable switching device for controlling said first and second input means, said bistable switching device being operable to a first condition in which the first input means is effective and the second input means is ineffective and to a second condition in which the first input means is ineffective and the second input means is effective, means for operating said bistable switching device between said first and second conditions, and means controlled by said bistable switching device in said second condition for providing an indication when at least one of said detecting means fails to provide an output signal.

7. In an electronic switching system, a pair of lines, switching means for establishing a communication path between said lines in at least partial dependence on control voltages applied to said switching means, a plurality of detecting means each responsive to an applied signal of a different frequency to provide an output signal to said switching means, first input means for supplying different frequency signals derived from said least one of said lines to said plurality of detecting means, second input means for applying signals of all of said different frequencies to said plurality of detecting means, a bistable switching device for controlling said first and second input means, said bistable switching device being operable to a first condition in which the first input means is effective and the second input means is ineffective and to a second condition in which the first input means is ineffective and the second input means is effective, means for operating said bistable switching device to said conditions, and means controlled by said output signals for operating said bistable switching device to said first condition only when an output signal is received from each of said detecting means.

8. The system set forth in claim 7 including an alarm means controlled by said bistable switching device and operable to provide an indication of the inoperability of at least one of said detecting means when said bistable switching device remains in said second condition for longer than a predetermined period of time.

9. A testing circuit for use with plural frequency signaling circuits comprising a plurality of detecting means each adapted to detect a different frequency signal, input means for normally applying signals of various frequencies to said plurality of detecting means, a signal source providing signals of all of said different frequencies, first control means for rendering said input means ineffective and for rendering said signal source effective to supply signals to said plurality of detecting means, and second control means for providing an indication when at least one of said plurality of detecting means fails to detect a signal from said signal source.

10. A testing system for use with plural frequency signaling circuits, a plurality of separate detecting means each operable to supply an output signal when energized by a signal of a given one of a plurality of different frequencies, signal utilization means connected to said plurality of detecting means and controlled by said output signals, input means normally effective to supply signals of said different frequencies to said plurality of detecting means to provide output signals to said signal utilization means, a test signal source for supplying signals of all of said frequencies to said plurality of detecting means, a voltage responsive network energized by said output signals and operable to provide one indication when an output signal is received from each of said detecting means and to provide a different indication when an output signal is not received from at least one of said detecting means, and control means for rendering said input means ineffective and said signal source effective to supply signals to said plurality of detecting means.

11. The testing system set forth in claim 10 including means controlled by said voltage responsive network for operating said control means.

12. A checking system for use with plural frequency signaling circuits in which signals of $N-1$ or less different frequencies are concurrently transmitted, a group of N separate detecting means each responsive to a different frequency signal to provide an output signal, signal utilization means controlled by said output signals, input means for normally applying signals of $N-1$ or less frequencies to said N detecting means to provide output signals for operating said utilization means, a source of signals of N frequencies, and check means for determining the operability of said detecting means including both means for connecting said source to said detecting means and means responsive to said output signals for determining whether an output signal is received from each of said detecting means.

13. The system set forth in claim 12 in which said check means includes means responsive to said output signals for rendering said input means ineffective.

14. A checking system for use with plural frequency signaling circuits in which signals of $N-1$ or less frequencies are concurrently transmitted, comprising a group of N separate detecting means each responsive to a signal of a different frequency to provide an output signal, a signal utilization means provided with said output signals, input means for supplying signals of $N-1$ or less frequencies to said detecting means, means for applying signals of N frequencies to said detecting means, and means supplied with said output signals and responsive to the receipt of N output signals for rendering said input means effective.

References Cited in the file of this patent

UNITED STATES PATENTS

| | | |
|---|---|---|
| 2,236,246 | King | Mar. 25, 1941 |
| 2,739,298 | Lovell | Mar. 20, 1956 |